United States Patent Office 2,788,368
Patented Apr. 9, 1957

2,788,368

PROCESS FOR RECOVERING GLUTAMIC ACID

Joseph L. Purvis, Northbrook, Ill., assignor to International Minerals & Chemical Corporation, a corporation of New York No Drawing. Application July 7, 1954,
Serial No. 441,925

16 Claims. (Cl. 260—527)

This invention relates to a new and improved process for the production of glutamic acid and more particularly to a process for the recovery of glutamic acid from Steffen's filtrate.

Glutamic acid has been obtained from Steffen's filtrate by various procedures involving hydrolysis with either acid or alkaline reagents. Acid hydrolysis of Steffen's filtrate to recover glutamic acid is potentially more advantageous than alkaline hydrolysis in being more efficient, that is, in more complete hydrolyzing Steffen's filtrate to produce a higher percentage of glutamic acid content in the hydrolyzate. However, none of the processes utilizing acid hydrolysis has been entirely satisfactory for recovering the glutamic acid made available during the hydrolysis. Also, prior processes utilizing acid hydrolysis have been beset with other difficulties, for example, certain recovery steps were corrosive to equipment, and relatively large amounts of expensive reagents were needed. No single process has heretofore been deveolped which would take advantage of the greater efficiency of acid as a hydrolyzing agent for Steffen's filtrate by providing a method whereby the recoveries of glutamic acid could be effected with efficiency and economy.

One object of this invention is to provide a new and improved process for the production and recovery of glutamic acid from Steffen's filtrate.

Another object of the invention is to provide a new and improved process whereby glutamic acid is recovered from Steffen's filtrate in higher yields than have heretofore been obtained in the absence of excessively corrosive process steps.

Another object of the invention is to provide a new and improved process whereby glutamic acid is recovered from Steffen's filtrate, which has been hydrolyzed with acid, using substantially lesser amounts of reagents than is customarily utilized in such recoveries.

Another object of this invention is to provide a new and improved process whereby a Steffen's filtrate acid hydrolyzate is concentrated in a manner to avoid the excessive corrosion which has accompanied the processing of acid hydrolyzates for the conventional recovery of glutamic acid in the past.

In accordance with the present invention, it has been found that glutamic acid may be efficiently and economically recovered from Steffen's filtrate by hydrolyzing Steffen's filtrate, from which a substantial amount of inorganic salts have been removed, with a non-oxidizing mineral acid, that is, a mineral acid non-oxidizing under the conditions obtaining, separating the hydrolyzate into two fractions, A and B—fraction A containing between about 20% and about 60% of the hydrolyzate liquor, and fraction B containing insoluble material and the remaining liquor—treating fraction B with an aqueous solution of an alkali in sufficient amount to obtain a pH between about 4 and about 6, separating insoluble material from fraction B, concentrating fraction B and separating salts therefrom, treating fraction B with fraction A to give a pH of about 3.2, and recovering glutamic acid from the resultant solution.

More particularly, the process of this invention comprises treating Steffen's filtrate, either dilute or concentrated, with sulfuric acid to remove inorganic salts, hydrolyzing the resultant solution with a non-oxidizing mineral acid, such as hydrochloric acid, separating the hydrolyzate into two fractions, A and B; fraction A containing between about 20% to about 60% hydrolyzate liquor; and fraction B containing solid material and the remaining hydrolyzate liquor, treating fraction B with an alkali compound, such as NaOH, $Na_2CO_3$, KOH, $K_2CO_3$, $NH_3$, or $(NH_4)_2CO_3$, to give a pH of between about 4 and about 6. The alkali is preferably utilized in the form of an aqueous solution but anhydrous alkali, for example, sodium hydroxide in pellet form or anhydrous ammonia may also be utilized where it is desired to keep the volume of solution at an absolute minimum. Sodium hydroxide is a preferred alkali. Following adjustment of fraction B to pH 4 to 6, the remaining steps in the process comprise separation of insoluble material from fraction B, concentrating fraction B at least to the point of incipient crystallization of salts, and separating said salts, treating fraction B with fraction A to give a pH of about 3.2, and recovering glutamic acid from the resulting solution.

In a preferred embodiment of the invention, Steffen's filtrate produced by either the barium or calcium treatment of beet sugar molasses, which preferably has been concentrated to a specific gravity between about 1.2 and about 1.4, is treated with sulfuric acid to give a pH between about 2.0 and about 2.9 and preferably a pH of about 2.6. While concentrated sulfuric acid (about 95% $H_2SO_4$) is preferably employed in this step, more dilute solutions of sulfuric acid can be used. Such dilute solutions are usually avoided as their use involves dilution of the Steffen's filtrate, which is undesirable since the solutions must be concentrated for subsequent steps in the process in order to achieve crystallization of salts and other solids therefrom. The temperature of the Steffen's filtrate is not permitted to exceed 70° C. during the addition of the sulfuric acid. The sulfuric acid treated Steffen's filtrate is allowed to cool to a temperature of between about 0° C. and about 50° C. and the inorganic sulfate salts, in particular sodium and potassium sulfate, are crystallized and separated therefrom. This separation of salts may be accomplished by any suitable means, for example with a filter press or a basket centrifuge.

The resulting filtrate is then hydrolyzed usually under acidic conditions. Concentrated hydrochloric acid (about 37% HCl) is preferably employed in the hydrolysis step and hydrolysis is carried out at a temperature between about 100° C. and about 125° C. for a period of between about ¼ hour and about 4 hours. The hydrolyzate is divided into two fractions, A and B, by any convenient means, for example by filtration; fraction A comprising about 20% to about 40% of the hydrolyzate liquor; and fraction B comprising insoluble material, such as humin, and the remaining hydrolyzate liquor. Fraction A is set aside to be utilized later in the process. Fraction B is treated with an alkali, such as NaOH, KOH, or $NH_3$, preferably an aqueous solution of an alkali metal compound, such as sodium hydroxide, to give a pH of between about 4 and about 6. The adjusted fraction B may either be filtered to remove insoluble organic matter (humin) and salts which may crystallize at this step in the process or it may be concentrated directly to a point at which crystallization of salts occurs. Usually concentration to between about 55% and about 90% of the weight of the original Steffen's filtrate will suffice. Concentration is always carried out at least to the point of incipient crystallization of salts and desirably until the viscosity of the solution is between about 325 centipoises and about 425 centipoises, preferably about 375 centipoises. Inorganic salts are then crystallized and separated from fraction B in conventional manner.

Following concentration of fraction B and separation of inorganic salts therefrom, fraction B is treated with fraction A in sufficient amount to give a pH of about 3.2. The resulting solution of glutamic acid with or without additional concentration at a pH of about 3.2 is allowed to stand for several days in order to permit crystallization of glutamic acid. The product is separated from the solution by suitable means, for example by employing a basket type centrifuge. The product may either be dried directly or may be repulped with at least about 60% by weight of water, and preferably an equal weight of water, in order to remove residual inorganic salts. The purity of the repulped glutamic acid is between about 85% and about 95% and may be converted directly into monosodium glutamate by neutralization with one equivalent of an alkaline reagent, such as sodium hydroxide, sodium carbonate, or sodium bicarbonate. Monosodium glutamate is utilized in the food industry as a flavor enhancing material.

According to a further embodiment of the invention, Steffen's filtrate which has been concentrated to a specific gravity between about 1.2 and about 1.4 is treated with sulfuric acid to separate inorganic salts therefrom as outlined above and the filtrate resulting from the separation of these inorganic salts is concentrated to between about 50% and about 90% of the weight of the original Steffen's filtrate, said concentration depending upon the viscosity of the solution and upon the amount of available betaine. The concentrated solution is then treated with anhydrous HCl or concentrated hydrochloric acid (about 37% HCl) at a temperature not greater than 70° C. to give a pH of between about 0.2 and about 1.0, and preferably a pH of about 0.6. Since dilution of the solution with water is undesirable for the reasons previously mentioned, it is preferable to use gaseous HCl or concentrated hydrochloric acid with an HCl content approximately as previously stated. However, more dilute hydrochloric acid may be employed provided that the resulting solution be concentrated to a further degree in order to achieve crystallization of betaine hydrochloride. The HCl treated solution is cooled to a temperature between about 0° C. and about 35° C., preferably to about 20° C. in order to crystallize betaine hydrochloride therefrom. The removal of betaine hydrochloride may be accomplished by any suitable means, for example by employing a filter or basket type centrifuge. Following removal of betaine hydrochloride, the resultant solution may be hydrolyzed and glutamic acid recovered as above outlined.

In a further embodiment of the invention, the acid hydrolyzate from which inorganic sulfate salts have previously been removed is separated into fractions A and B as mentioned above and fraction A, which according to this embodiment contains from about 40% to about 60% of the hydrolyzate liquor, is set aside for later use. Fraction B, containing insoluble material and the remaining hydrolyzate liquor, is treated with an alkaline Steffen's filtrate hydrolyzate prepared by hydrolyzing Steffen's filtrate with an alkali metal hydroxide, such as potassium or sodium hydroxide, preferably utilizing not more than 10% of the reagent based on the weight of Steffen's filtrate, the temperature during the hydrolysis being maintained below 100° C. and preferably at about 85° C. Usually about 2 hours will suffice to convert the glutamic acid mother substances into glutamic acid. The pH of the alkaline hydrolyzate is usually of the order of about 13 or higher and may be used directly to adjust the above mentioned acid hydrolyzate to give a pH of between about 4 and about 6, taking the usual precautions to avoid conditions conducive to precipitation of substantial amounts of glutamic acid. Following adjustment of the pH of fraction B of the acid hydrolyzate with the alkaline Steffen's filtrate hydrolyzate, removal of insoluble material, concentration of fraction B and removal of inorganic salts may be attained following the same procedure as described where fresh alkali compound, such as sodium hydroxide in the form of an aqueous solution is employed to effect this pH adjustment. Utilization of the alkaline Steffen's filtrate hydrolyzate for pH adjustment purposes at this point affords the obvious economy of avoiding use of fresh reagent. The purity of the glutamic acid product following this embodiment is between about 85% and about 95%.

The following examples illustrate specific embodiments of this invention. All parts and percentages are by weight unless otherwise indicated.

*Example I*

Concentrated Steffen's filtrate in the amount of 1000 parts having a pH of about 10, and containing 58.4% solids was adjusted to pH 2.0 by the addition of 156 parts of concentrated sulfuric acid (95%). The temperature during acid addition was maintained slightly below 60° C. The resulting mixture was cooled to room temperature and after standing for 6 hours was filtered. The filter cake was washed with three 50-part portions of water. The dried sulfate filter cake amounted to 250 parts.

The filter cake washings and main filtrate were combined and acidified by the addition of 394 parts of 33% hydrochloric acid, digested for several hours at 70° C. to 80° C. and then refluxed for 3 hours to effect hydrolysis. The acid hydrolyzate was filtered to remove 500 parts of liquor (fraction A) and the wet filter cake, comprising insoluble humin, was combined with the unfiltered hydrolyzate to form a slurry (fraction B). The slurry was adjusted to pH 4.5 by mixing it with a solution resulting from alkaline hydrolysis of 1000 parts of concentrated Steffen's filtrate (substantially identical with the starting material). This alkaline Steffen's filtrate hydrolyzate had a pH in excess of 13. The alkaline hydrolysis of Steffen's filtrate was accomplished by treating 1000 parts of concentrated Steffen's filtrate with about 81 parts of sodium hydroxide dissolved in about 81 parts of water. The hydrolysis was carried out at about 85° C. for a period of about 2¼ hours. The resulting hydrolyzate was used directly to adjust the pH of fraction B to 4.5.

Following adjustment of the pH of fraction B to 4.5, the slurry was filtered to remove humin and the filter cake was washed with a 10% sodium chloride solution, the washings being combined with the main filtrate. The filtrate was concentrated to a viscosity of about 375 centipoises at 80° C. and inorganic salts which precipitated were removed by filtration, the filter cake being washed with 50 parts of water. The filtrate with the combined washings was treated with the liquor of fraction A obtained from the acid hydrolysis in the amounts required to give a pH of 3.2 to the combined liquors. The resulting mixture was seeded with about 4 parts by weight of pure crystalline glutamic acid, cooled to room temperature with constant stirring and allowed to stand 5 days to allow crystallization of glutamic acid. After the 5 day crystallization period, the crude glutamic acid was separated from the mother liquor by filtration. The end liquor amounted to 1162 parts.

The crude glutamic acid was repulped with 350 parts of water, filtered and dried. The dried cake contained 88% glutamic acid and constituted a yield of 80% of the glutamic acid values in the starting materials.

*Example II*

Concentrated Steffen's filtrate in the amount of about 2000 parts and having a pH of about 10 and containing about 58.4% solids was concentrated to about 1800 parts. Concentrated sulfuric acid (95%) in the amount of about 268 parts was added to the Steffen's filtrate, thereby adjusting the pH to 2.6. The temperature during the acid addition was maintained slightly below 60° C. The resulting mixture was cooled to room temperature and after standing for 6 hours was filtered to remove solid material. The filter cake was washed with three 75-part portions of water and the washings were combined with the main filtrate. The dried filter cake amounted to about 400 parts and contained about 35% K₂O equivalent.

The filtrate and combined washings were concentrated to about 1140 parts, adjusted to pH 0.5 by the addition of about 229 parts of 33% hydrochloric acid, then allowed to stand over night to permit crystallization of betaine hydrochloride. The betaine hydrochloride was removed by filtration and washed with two 25-part portions of 10% hydrochloric acid. The washings were combined with the main filtrate. The dried betaine hydrochloride cake amounted to about 140 parts and contained about 90% betaine hydrochloride.

The filtrate from the betaine hydrochloride crystallization and the combined washings of the filter cake were acidified by the addition of about 448 parts of 33% hydrochloric acid. The acidified mixture was digested several hours at about 70° C. to about 80° C. and then brought to a boil and refluxed for about 3 hours in order to effect hydrolysis.

The hydrolyzate was separated by filtration into two fractions A and B. The hydrolyzate was partially filtered to give about 450 parts of filtrate (fraction A). The wet filter cake comprising humin, was combined with the unfiltered hydrolyzate, thereby forming a slurry (fraction B). The slurry was combined with about 465 parts of a 50% aqueous sodium hydroxide solution, thereby adjusting the pH to about 4.5. Insoluble material comprising humin was filtered from the slurry and washed with 10% sodium chloride solution. The washings were combined with the main filtrate. The filter cake comprising humin had a dry weight of about 160 parts.

The filtrate from the humin separation was concentrated to a viscosity of about 375 centipoises at 80° C. Inorganic salts were removed by filtration, the pH was then adjusted to about 3.2 by addition of a sufficient quantity of fraction A, and glutamic acid was recovered by methods well known in the art. The recovery of glutamic acid was 85% of the total glutamic acid values in the concentrated Steffen's filtrate starting material.

*Example III*

Concentrated Steffen's filtrate in the amount of 2000 parts and having a pH of about 10 and containing 58.4% solids was concentrated to 1800 parts. Concentrated sulfuric acid (95%) in the amount of 268 parts was added to the Steffen's filtrate, thereby adjusting the pH to 2.6. The temperature during the acid addition was maintained slightly below 60° C. The resulting mixture was cooled to room temperature and after standing for six hours was filtered to remove solid material. The filter cake was washed with three 75-part portions of water and the washings were combined with the main filtrate. The dried filter cake amounted to 400 parts and contained about 35% K₂O equivalent.

The filtrate and combined washings were concentrated to about 1140 parts and were acidified by the addition of 670 parts of 33% hydrochloric acid. The acidified mixture was digested several hours at about 76° C. and then brought to a boil and refluxed for about three hours to effect hydrolysis. About one-third of the acid hydrolyzate was filtered to give about 560 parts of filtrate (fraction A) and the wet filter cake comprising insoluble humin was combined with the unfiltered hydrolyzate to form a slurry (fraction B). The slurry was adjusted to pH 4.5 by addition of 480 parts of 50% aqueous sodium hydroxide solution. Insoluble material comprising humin was filtered from the slurry and washed with 10% aqueous sodium chloride solution. The washings were combined with the main filtrate.

The filtrate from the humin separation was concentrated to a viscosity of about 375 centipoises (80° C.). Inorganic salts were removed by filtration and the pH was then adjusted to about 3.2 by addition of a sufficient quantity of fraction A. Glutamic acid was recovered by conventional methods. The recovery of glutamic acid amounted to 82% of the total glutamic acid values in the concentrated Steffen's filtrate starting material.

I claim:

1. A process comprising treating Steffen's filtrate with sulfuric acid and separating inorganic sulfates therefrom, hydrolyzing the resultant solution with a non-oxidizing mineral acid, separating the hydrolyzate into fractions A and B, fraction A containing between about 20% to about 60% of the hydrolyzate liquor, and fraction B containing insoluble material and the remaining hydrolyzate liquor, treating fraction B with sufficient alkali to give a pH between about 4 and about 6, separating insoluble material from fraction B, concentrating fraction B at least to the point of incipient crystallization of salts, and separating said salts, treating fraction B with a sufficient amount of fraction A to give a pH of about 3.2, and recovering glutamic acid from the resultant solution.

2. A process comprising treating Steffen's filtrate with sulfuric acid to give a pH between about 2.0 and about 2.9, separating inorganic sulfates therefrom, hydrolyzing the resultant solution with a non-oxidizing mineral acid, separating the hydrolyzate into fractions A and B, fraction A containing between about 20% to about 60% of the hydrolyzate liquor, and fraction B containing insoluble material and the remaining hydrolyzate liquor, treating fraction B with an alkali to give a pH between about 4 and about 6, separating insoluble material from fraction B, concentrating fraction B at least to the point of incipient crystallization of salts, and separating said salts, treating fraction B with a sufficient amount of fraction A to give a pH of about 3.2, and recovering glutamic acid from the resultant solution.

3. The process of claim 2 wherein the non-oxidizing mineral acid is hydrochloric acid and the alkali is an alkali metal compound in the form of an aqueous solution.

4. The process of claim 3 wherein the alkali metal compound is sodium hydroxide.

5. The process of claim 4 wherein fraction B is concentrated to a viscosity between about 325 centipoises and about 425 centipoises prior to separation of inorganic salts.

6. The process comprising treating Steffen's filtrate with sulfuric acid to give a pH between about 2.0 and about 2.9, separating inorganic sulfates therefrom, hydrolyzing the resultant solution with hydrochloric acid, separating the hydrolyzate into fractions A and B, fraction A containing between about 20% to about 40% of the hydrolyzate liquor and fraction B containing insoluble material and the remaining hydrolyzate liquor, treating fraction B with an aqueous solution of sodium hydroxide to give a pH between about 4.5 and about 5.5, separating insoluble material from fraction B, concentrating fraction B to a viscosity between about 325 centipoises and about 425 centipoises, separating inorganic salts from the resulting concentrate, treating fraction B with a sufficient amount of fraction A to give a pH of about 3.2, and recovering glutamic acid from the resultant solution.

7. The process comprising treating Steffen's filtrate with sulfuric acid to give a pH between about 2.0 and about 2.9, separating inorganic sulfates therefrom, hydrolyzing the resultant solution with hydrochloric acid, separating the hydrolyzate into fractions A and B, fraction A containing between about 20% to about 60% of the hydrolyzate liquor and fraction B containing insoluble material and the remaining hydrolyzate liquor, treating fraction B with an alkaline Steffen's filtrate hydrolyzate to give a pH between about 4.5 and about 5.5, separating insoluble material from fraction B, concentrating fraction B to a viscosity between about 325 centipoises and about 425 centipoises, separating inorganic salts from the resulting concentrate, treating fraction B with a sufficient amount of fraction A to give a pH of about 3.2, and recovering glutamic acid from the resultant solution.

8. The process comprising treating Steffen's filtrate with sulfuric acid to give a pH between about 2.0 and about 2.9, separating inorganic sulfates therefrom, hydrolyzing the resultant solution with hydrochloric acid, separating the hydrolyzate into fractions A and B, fraction A containing between about 40% to about 60% of the hydrolyzate liquor and fraction B containing insoluble material and the remaining hydrolyzate liquor, treating fraction B with an alkaline Steffen's filtrate hydrolyzate to give a pH between about 4.5 and about 5.5, separating insoluble material from fraction B, concentrating fraction B to a viscosity between about 325 centipoises and about 425 centipoises, separating inorganic salts from the resulting concentrate, treating fraction B with a sufficient amount of fraction A to give a pH of about 3.2, and recovering glutamic acid from the resultant solution.

9. The process comprising treating Steffen's filtrate with sulfuric acid and separating inorganic sulfates therefrom, adding hydrochloric acid to the resultant liquor to give a pH between about 0.2 and about 1.0, separating a solid composition comprising essentially betaine hydrochloride therefrom, hydrolyzing the resultant solution with a non-oxidizing mineral acid, separating the hydrolyzate into fractions A and B, fraction A containing about 20% to about 60% of the hydrolyzate liquor, and fraction B containing insoluble material and the remaining hydrolyzate liquor, treating fraction B with an alkali to give a pH between about 4 and about 6, separating insoluble material from fraction B, concentrating fraction B at least to the point of incipient crystallization of salts and separating said salts, treating fraction B with fraction A to give a pH of about 3.2, and recovering glutamic acid from the resultant solution.

10. The process of claim 9 wherein the non-oxidizing mineral acid is hydrochloric acid and the alkali is an alkali metal compound in the form of an aqueous solution.

11. The process comprising treating Steffen's filtrate with sulfuric acid to give a pH between about 2.0 and about 2.9, separating inorganic sulfates therefrom, adding hydrochloric acid to the resultant liquor to give a pH between about 0.2 and about 1.0, separating a solid composition comprising essentially betaine hydrochloride therefrom, hydrolyzing the resultant solution with a non-oxidizing mineral acid, separating the hydrolyzate into fractions A and B, fractions A containing about 20% to about 60% of the hydrolyzate liquor, and fraction B containing insoluble material and the remaining hydrolyzate liquor, treating fraction B with an alkali to give a pH between about 4 and about 6, separating insoluble material from fraction B, concentrating fraction B at least to the point of incipient crystallization of salts and separating said salts, treating fraction B with fraction A to give a pH of about 3.2, and recovering glutamic acid from the resultant solution.

12. The process of claim 11 wherein the alkali metal compound is sodium hydroxide.

13. The process of claim 12 wherein fraction B is concentrated to a viscosity between about 325 centipoises and about 425 centipoises prior to separation of inorganic salts.

14. The process comprising treating Steffen's filtrate with sulfuric acid to give a pH between about 2.0 and about 2.9, separating inorganic sulfates therefrom, adding hydrochloric acid to the resultant liquor to give a pH between about 0.2 and about 1.0, separating a solid composition comprising essentially betaine hydrochloride therefrom, hydrolyzing the resultant solution with hydrochloric acid, separating the hydrolyzate into fractions A and B, fraction A containing about 20% to about 40% of the hydrolyzate liquor, and fraction B containing insoluble material and the remaining hydrolyzate liquor, treating fraction B with an aqueous solution of sodium hydroxide to give a pH between about 4.5 and about 5.5, separating insoluble material from fraction B, concentrating fraction B to a viscosity between about 325 centipoises and about 425 centipoises, and separating inorganic salts, treating fraction B with a sufficient amount of fraction A to give a pH of about 3.2, and recovering glutamic acid from the resultant solution.

15. The process comprising treating Steffen's filtrate with sulfuric acid to give a pH between about 2.0 and about 2.9, separating inorganic sulfates therefrom, adding hydrochloric acid to the resultant liquor to give a pH between about 0.2 and about 1.0, separating a solid composition comprising essentially betaine hydrochloride therefrom, hydrolyzing the resultant solution with hydrochloric acid, separating the hydrolyzate into fractions A and B, fraction A containing about 20% to about 60% of the hydrolyzate liquor, and fraction B containing insoluble material and the remaining hydrolyzate liquor, treating fraction B with an alkaline Steffen's filtrate hydrolyzate to give a pH between about 4 and about 6, separating insoluble material from fraction B, concentrating fraction B at least to the point of incipient crystallization of salts and separating said salts, treating fraction B with a sufficient amount of fraction A to give a pH of about 3.2, and recovering glutamic acid from the resultant solution.

16. The process comprising treating Steffen's filtrate with sulfuric acid to give a pH between about 2.0 and about 2.9, separating inorganic sulfates therefrom, adding hydrochloric acid to the resultant liquor to give a pH between about 0.2 and about 1.0, separating a solid composition comprising essentially betaine hydrochloride therefrom, hydrolyzing the resultant solution with hydrochloric acid, separating the hydrolyzate into fractions A and B, fraction A containing about 40% to about 60% of the hydrolyzate liquor, and fraction B containing insoluble material and the remaining hydrolyzate liquor, treating fraction B with an alkaline Steffen's filtrate hydrolyzate to give a pH between about 4.5 and about 5.5, separating insoluble material from fraction B, concentrating fraction B to a viscosity between about 325 centipoises and about 425 centipoises and separating inorganic salts, treating fraction B with a sufficient amount of fraction A to give a pH of about 3.2, and recovering glutamic acid from the resultant solution.

References Cited in the file of this patent

UNITED STATES PATENTS

| | | |
|---|---|---|
| 2,519,573 | Hoglan | Aug. 22, 1950 |
| 2,548,124 | Schlaeger et al. | Apr. 10, 1951 |